(12) United States Patent
Smith et al.

(10) Patent No.: US 12,275,848 B2
(45) Date of Patent: Apr. 15, 2025

(54) BELT USING HIGH PERFORMANCE COST-EFFECTIVE ELASTOMERIC MATERIAL

(71) Applicant: ContiTech Deutschland GmbH, Hannover (DE)

(72) Inventors: Matthew Smith, Mooresville, NC (US); Thomas George Burrowes, North Canton, OH (US)

(73) Assignee: ContiTech Deutschland GmbH, Hannover (DE)

( * ) Notice: Subject to any disclaimer, the term of this patent is extended or adjusted under 35 U.S.C. 154(b) by 64 days.

(21) Appl. No.: 18/338,441

(22) Filed: Jun. 21, 2023

(65) Prior Publication Data

US 2024/0425684 A1 Dec. 26, 2024

(51) Int. Cl.

| C08L 9/02 | (2006.01) |
|---|---|
| B60C 1/00 | (2006.01) |
| C08G 65/24 | (2006.01) |
| C08K 3/04 | (2006.01) |
| C08K 3/24 | (2006.01) |
| C08K 3/36 | (2006.01) |

(52) U.S. Cl.
CPC .................... C08L 9/02 (2013.01); B60C 1/00 (2013.01); C08K 3/04 (2013.01); C08K 3/36 (2013.01); *C08L 2203/20* (2013.01)

(58) Field of Classification Search
CPC .... C08K 3/04; C08K 3/36; C08K 5/34; B60C 1/00; C08G 65/24; C08L 9/02
USPC ......................................................... 524/565
See application file for complete search history.

(56) References Cited

U.S. PATENT DOCUMENTS

| 4,251,648 A * | 2/1981 | Oetzel .................... C08G 65/24 523/427 |
|---|---|---|
| 6,245,420 B1 * | 6/2001 | Nishio .................... C08L 71/03 428/292.1 |
| 11,420,872 B2 | 8/2022 | Lin et al. |
| 11,473,391 B2 | 10/2022 | Jakkula et al. |
| 2008/0139709 A1 * | 6/2008 | Piccirilli ................... F16G 1/28 524/106 |
| 2013/0040771 A1 * | 2/2013 | Well ......................... F16G 1/28 474/205 |
| 2021/0080035 A1 | 3/2021 | Herrmann et al. |

FOREIGN PATENT DOCUMENTS

WO WO-0004098 A1 * 1/2000 .............. C08L 21/00

OTHER PUBLICATIONS

Andrew Mittermiller, HNBR Blends with Hydrin® (ECO):Extending HNBR Supply, 37 pages, 2022, Zeon Chemicals L.P.
International Search Report and Written Opinion dated Sep. 12, 2024 of International Application PCT/US2024/034502 claiming priority this application.

* cited by examiner

*Primary Examiner* — Deve V Hall
(74) *Attorney, Agent, or Firm* — Richard A. Wolf; Gregory Adams (57) ABSTRACT

A belt body has an outer surface and an inner facing toothed surface and includes or is comprised of an elastomeric composition; and tensile members. The elastomeric composition including: from about 50 to 90 parts per hundred rubber of a zinc diacrylate modified hydrogenated acrylonitrile-butadiene rubber, and/or an unmodified hydrogenated acrylonitrile-butadiene rubber; from about 10 to 50 parts per hundred rubber of a peroxide curable polyepichlorohydrin copolymer or terpolymer; wherein the elastomeric composition is cured using a free radical promoting material, wherein the free radical promoting material is a peroxide selected from the group consisting of diacyl peroxides, peroxyesters, dialkyl peroxides and peroxyketals and is used in an amount from about 0.5 to 7 parts per hundred rubber, and wherein the peroxide co-agent is selected from the group consisting of 1, 2 polybutadienes, organic acrylates, organic methacrylates, metal salts of an alpha, beta-unsaturates organic acid and mixtures thereof and is used in an amount from about 2 to about 10 parts per hundred rubber.

12 Claims, 4 Drawing Sheets

|  | Mix 1 | Mix 2 | Mix 3 | Mix 4 |
| --- | --- | --- | --- | --- |
| HNBR[1] | 50 | 50 | 70 | 50 |
| HNBR[2] | 50 |  | 20.7 |  |
| ECO[3] |  | 50 |  | 40 |
| Silica[4] | 15 | 15 |  |  |
| N762/N330 Carbon Black[5] | 30 | 30 | 30 | 30 |
| Antioxidant (TMQ)[6] | 1 | 1 | 1 | 1 |
| Antioxidant (DPA)[7] | 2 | 2 | 2 | 2 |
| Peroxide[8] | 3 | 3 | 4.2 | 4.2 |
| Co-Agent[9] |  |  | 4.2 | 4.2 |
| Phenolic Resin[10] |  |  | 20 | 20 |

1 Zeoforte ZSC 2295 Supplied By Zeon

2 Zetpol 2020L Supplied By Zeon

3 DP5250 Supplied By Zeon

4 Hi-Sil 243LD Supplied By PPG

5 N762 Or N330 Carbon Black

6 Agerite TMQ Supplied By RT Vanderbilt

7 Oxoflex DPA Supplied By Soveriegn Chemical

8 Varox DBPH 50% Supplied By RT Vanderbilt / Vul-Cup 40C Supplied By Arkema

9 PLC(TMPTMA) 72% Supplied By

10 Polydex Z(D12687) 50% Supplied By Polychem Dispersions

Mixtures

FIG. 3

|  |  | Mix 1 | Mix 2 | Mix 3 | Mix 4 |
|---|---|---|---|---|---|
| MDR 20/340°F. ASTM D5289 | | | | | |
| ML | [dNm] | 3.02 | 3.41 | 1.66 | 1.62 |
| MH | [dNm] | 63.64 | 71.63 | 79.05 | 79.3 |
| Ts1 | [min] | 0.39 | 0.32 | 0.39 | 0.36 |
| T90 | [min] | 9.73 | 4.64 | 6.91 | 9.83 |
| S'@t90 | [dNm] | 57.58 | 64.81 | 71.31 | 71.53 |
| Rh | [dNm/min] | 32.45 | 69.7 | 30 | 26.57 |
| Tensile Test ASTM D412 Press/Sheet/20 Min/340°F. | | | | | |
| Peak Stress | [psi] | 3286 | 2713 | 3188 | 2756 |
| Elongation | [%] | 332 | 139 | 329 | 250 |
| Modulus @ 5% | [psi] | 332 | 517 | 832 | 627 |
| Modulus @ 10% | [psi] | 432 | 705 | 1020 | 823 |
| 180° F. Tensile Test ASTM D412 Press/Sheet/20 Min/340°F. | | | | | |
| Peak Stress | [psi] | 1721 | 1476 | 1670 | 1443 |
| Elongation | [%] | 256 | 102 | 266 | 147 |
| Modulus @ 5% | [psi] | 144 | 305 | 437 | 344 |
| Modulus @ 10% | [psi] | 225 | 428 | 579 | 477 |
| Hot Air Aging 168 Hours @ 275° F. | | | | | |
| Peak Stress | [psi] | 3074 | 2799 | 3369 | 3220 |
| Peak Stress | [%Retention] | -6% | 3% | 6% | 17% |
| Elongation | [%] | 114 | 50 | 54 | 46 |
| Elongation | [%Retention] | -66% | -64% | -84% | -82% |
| Modulus @ 5% | [psi] | 373 | 767 | 1509 | 1465 |
| Modulus @ 5% | [%Retention] | 12% | 48% | 81% | 134% |
| Modulus @ 10% | [psi] | 538 | 1105 | 1949 | 1906 |
| Modulus @ 10% | [%Retention] | 25% | 57% | 91% | 132% |
| Compression Set 70 Hours/275° F./ 25% Norm ASTM D395 Cure 30 Min/330° F. | | | | | |
| Compression Set | [%] | 66.7% | 82.8% | 94.0% | 87.3% |

Test Result

FIG. 4

BELT USING HIGH PERFORMANCE COST-EFFECTIVE ELASTOMERIC MATERIAL

FIELD

This invention pertains to the art of elastomeric blends suitable for use in vehicle timing belts and other apparatuses that may be constructed with elastomeric compositions.

BACKGROUND

Hydrogenated nitrile rubber and specifically, hydrogenated acrylonitrile butadiene rubber (HNBR) can be used in vehicle timing belts. HNBR has high tensile strength, low permanent set, good abrasion resistance and high elasticity. Further, HNBR demonstrates good stability towards thermal aging and exhibits better properties at low temperatures compared to other suitable heat- and oil-resistant elastomers. Moreover, HNBR has good static and dynamic properties at operation temperatures and good retention of properties under continuous heat exposure. There are several other physical properties of HNBR that make it useful in automotive belt applications, including good viscoelastic properties in HNBR vulcanizates, a wide service temperature range from −40° C. to +150° C., resistance to fluids of various chemical compositions and excellent resistance to strongly alkaline and aggressive fluids.

Though HNBR exhibits excellent material properties for use in timing belts and other similar applications, HNBR is more expensive than conventionally used elastomers, including polychloroprene. Given the considerable expense of using elastomeric compositions containing high proportions of HNBR in timing belt and other similar applications, it is desirable to formulate blends of HNBR with lower cost diluents to reduce the overall cost of the elastomer component. It is known, for example, to blend HNBR with low-cost fillers, such as carbon black or clay. While such HNBR/filler blends address the issue of reduced cost, the material characteristics and physical properties of such blends suffer with increasing concentrations of filler. It is, therefore, desirable to prepare HNBR/diluent blends for use in timing-belt applications and other articles conventionally constructed with high HNBR concentrate elastomeric compounds, which have significantly reduced cost, without an unsuitable reduction in the desirable material properties of the resulting composition, including dynamic properties, abrasion resistance and tensile strength.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Hydrogenated nitrile rubber and specifically, hydrogenated acrylonitrile butadiene rubber (HNBR) can be used in vehicle timing belts. HNBR has high tensile strength, low permanent set, good abrasion resistance and high elasticity. Further, HNBR demonstrates good stability towards thermal aging and exhibits better properties at low temperatures compared to other suitable heat- and oil-resistant elastomers. Moreover, HNBR has good static and dynamic properties at operation temperatures and good retention of properties under continuous heat exposure. There are several other physical properties of HNBR that make it useful in automotive belt applications, including good viscoelastic properties in HNBR vulcanizates, a wide service temperature range from −40° C. to +150° C., resistance to fluids of various chemical compositions and excellent resistance to strongly alkaline and aggressive fluids.

Though HNBR exhibits excellent material properties for use in timing belts and other similar applications, HNBR is more expensive than conventionally used elastomers, including polychloroprene. Given the considerable expense of using elastomeric compositions containing high proportions of HNBR in timing belt and other similar applications, it is desirable to formulate blends of HNBR with lower cost diluents to reduce the overall cost of the elastomer component. It is known, for example, to blend HNBR with low-cost fillers, such as carbon black or clay. While such HNBR/filler blends address the issue of reduced cost, the material characteristics and physical properties of such blends suffer with increasing concentrations of filler. It is, therefore, desirable to prepare HNBR/diluent blends for use in timing-belt applications and other articles conventionally constructed with high HNBR concentrate elastomeric compounds, which have significantly reduced cost, without an unsuitable reduction in the desirable material properties of the resulting composition, including dynamic properties, abrasion resistance and tensile strength.

One or more embodiments are disclosed for elastomeric blends wherein up to approximately 50 parts by weight of HNBR may be replaced with a suitable, low-cost elastomer diluent, namely Polyepichlorohydrin rubber (ECO). A free-radical crosslinking reaction using a free-radical promoting material may be used to cure the rubber blends.

In some aspects, the techniques described herein relate to an elastomeric composition including: from about 50 to 90 parts per hundred rubber of a zinc diacrylate modified hydrogenated acrylonitrile-butadiene rubber, and/or an unmodified hydrogenated acrylonitrile-butadiene rubber; from about 10 to 50 parts per hundred rubber of a peroxide curable polyepichlorohydrin copolymer or terpolymer; wherein the elastomeric composition is cured using a free radical promoting material, wherein the free radical promoting material is a peroxide selected from the group consisting of diacyl peroxides, peroxyesters, dialkyl peroxides and peroxyketals and is used in an amount from about 0.5 to 7 parts per hundred rubber, and wherein the peroxide co-agent is selected from the group consisting of 1, 2 polybutadienes, organic acrylates, organic methacrylates, metal salts of an alpha, beta-unsaturates organic acid and mixtures thereof and is used in an amount from about 2 to about 10 parts per hundred rubber.

In some aspects, the techniques described herein relate to an elastomeric composition, further including: from 10 phr to 80 phr of a carbon black.

In some aspects, the techniques described herein relate to an elastomeric composition, further including: up to 20 phr of precipitated silica.

In some aspects, the techniques described herein relate to an elastomeric composition, further including: up to 20 phr of plasticizer selected from the group consisting of ethers, esters e.g. adipates and sebacates, polyester, phosphate.

In some aspects, the techniques described herein relate to an elastomeric composition, further including ZDA and/or ZDMA added to compound for unmodified HNBRs from 5 to 30 phr.

In some aspects, the techniques described herein relate to an elastomeric composition, further including from about 1 to 4 phr of an antioxidant or antioxidant combination, selected from the group consisting of (zinc) 2-mercaptotolyimidazole, alkylated diphenylamines, phenyl-α-naphthylamine, alkylated phenyl-α-naphthylamine, dimethyl quinolines, trimethyldihydroquinolines and oligomeric compositions derive therefrom, hindered phenolics, alkylated hydroquinones, hydroxylated thiodiphenyl ethers, alkylidenebisphenols, thiopropionates, metallic dithiocarbamates, 1,3,4-domercaptothiadiazole and derivatives, and oil soluble copper compounds.

In some aspects, the techniques described herein relate to an elastomeric composition, wherein the composition includes from about 50 to 70 parts per hundred rubber of a zinc diacrylate modified hydrogenated acrylonitrile-butadiene rubber, and/or an unmodified hydrogenated acrylonitrile-butadiene rubber; and from about 30 to 50 parts per hundred rubber of a peroxide curable polyepichlorohydrin copolymer or terpolymer.

In some aspects, the techniques described herein relate to an elastomeric composition, wherein the composition includes from about 50 to 60 parts per hundred rubber of a zinc diacrylate modified hydrogenated acrylonitrile-butadiene rubber, and/or an unmodified hydrogenated acrylonitrile-butadiene rubber; and from about 40 to 50 parts per hundred rubber of a peroxide curable polyepichlorohydrin copolymer or terpolymer.

In some aspects, the techniques described herein relate to a timing belt including: a belt body having an outer surface and an inner facing toothed surface and included of an elastomeric composition; tensile members; the elastomeric composition including: from about 50 to 90 parts per hundred rubber of a zinc diacrylate modified hydrogenated acrylonitrile-butadiene rubber, and/or an unmodified hydrogenated acrylonitrile-butadiene rubber; from about 10 to 50 parts per hundred rubber of a peroxide curable polyepichlorohydrin copolymer or terpolymer; wherein the elastomeric composition is cured using a free radical promoting material, wherein the free radical promoting material is a peroxide selected from the group consisting of diacyl peroxides, peroxyesters, dialkyl peroxides and peroxyketals and is used in an amount from about 0.5 to 7 parts per hundred rubber, and wherein the peroxide co-agent is selected from the group consisting of 1, 2 polybutadienes, organic acrylates, organic methacrylates, metal salts of an alpha, beta-unsaturates organic acid and mixtures thereof and is used in an amount from about 2 to about 10 parts per hundred rubber.

In some aspects, the techniques described herein relate to a timing belt, wherein the elastomeric composition includes from about 50 to 70 parts per hundred rubber of a zinc diacrylate modified hydrogenated acrylonitrile-butadiene rubber, and/or an unmodified hydrogenated acrylonitrile-butadiene rubber; and from about 30 to 50 parts per hundred rubber of a peroxide curable polyepichlorohydrin copolymer or terpolymer.

In some aspects, the techniques described herein relate to a timing belt, the timing belt includes an inner-facing surface having a row of adjacent teeth, the row of teeth including the elastomeric composition.

In some aspects, the techniques described herein relate to a timing belt, the adjacent teeth having more parts per hundred rubber of a zinc diacrylate modified hydrogenated acrylonitrile-butadiene rubber, and/or an unmodified hydrogenated acrylonitrile-butadiene rubber than a belt body of the belt.

In some aspects, the techniques described herein relate to a timing belt, the adjacent teeth having less parts per hundred rubber of a zinc diacrylate modified hydrogenated acrylonitrile-butadiene rubber, and/or an unmodified hydrogenated acrylonitrile-butadiene rubber than a belt body of the belt.

According to one aspect of the present invention, an elastomeric blend is provided comprising from about 50 to less than about 100 parts per hundred rubber of HNBR, from about 0.1 to about 50 parts per hundred rubber of ECO.

According to another aspect of the invention, the elastomeric blends are preferably cured using a free-radical promoting material, which may be a peroxide.

According to yet another aspect of the invention, the peroxide may be used in amounts from about 0.1 to about 12 parts per hundred rubber (phr), and in other embodiments, from about 0.5 to about 7 phr.

According to another aspect of the invention, the elastomeric blends may further be cured with a free-radical curing coagent, which may be used in amounts from about 0.1 to about 15 phr, and more preferably from about 2 to about 10 phr.

According to another aspect of the invention, the elastomeric blends may further be cured with a phenolic resin, which may be used in amounts up to about 30 phr.

Peroxide-cured blends of HNBR and ECO rubber having suitable heat and ozone resistance for use in vehicle timing belts are also taught, as are timing belts constructed from the elastomeric blends.

Still other benefits and advantages of the invention will become apparent to those skilled in the art to which it pertains upon a reading and understanding of the following detailed specification.

Figure 1:
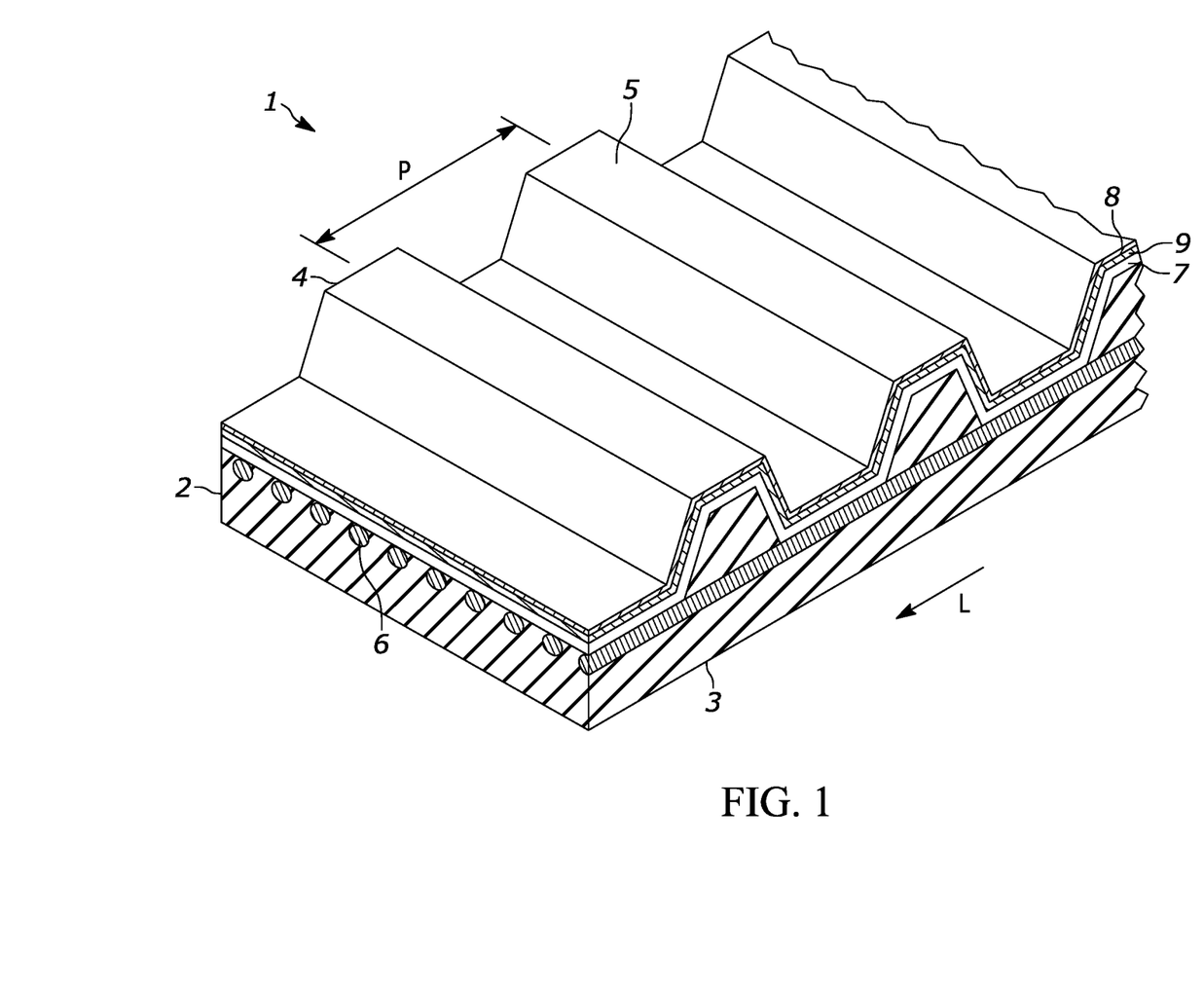
FIG. 1 illustrates a timing belt in accordance with one or more embodiments.

Referring now to the drawings wherein the showings are for purposes of illustrating an embodiment of the invention only and not for purposes of limiting the same, FIG. 1 shows exemplary timing belt 1 constructed with elastomeric-blend embodiments.

FIG. 1 illustrates a timing belt 1 in accordance with one or more embodiments.

The timing belt 1 may have belt body 2, having outer surface 3, and inner-facing toothed surface 4. Inner-facing surface 4 may have at least one row of adjacent rows of teeth 5 and when belt 1 is used, inner-facing surface 4 may contact another article (not shown) to drive belt 1 in a manner known in the art. Belt body 2 may be made of a resilient elastomer or elastomer composition and may be reinforced with longitudinal tensile members 6 that lie along belt longitudinal direction L.

Tensile members 6 may be comprised of a cord or plurality of cords having a high elastic modulus. The cord or cords may be made from glass fiber, carbon fiber, steel, polyester, high tenacity rayon, polyamide, aramids or other suitable material. In automotive applications, the tensile members are typically, but not necessarily, made using glass fibers. Inner-facing toothed surface 4 may be reinforced with abrasion-resistant fabric 7. Belt 1 may further include cover layer 8 and bonding layer 9 between cover layer 8 and fabric layer 7 to assist in adhering cover layer 8 to fabric layer 7.

A wide variety of elastomers in construction of belt body 2, including, e.g., polychloroprene, polyurethane, HNBR, BR, IIR, IR, SBR, CSM, EPDM, other thermosets, thermoplastic elastomers and other polymer alloys. Inventive embodiments, relate to elastomeric compositions or blends, described in further detail below, comprising HNBR, which are suitable for use in manufacturing belt body 2.

It is appreciated that varied elastomer compositions can be used for varied components of the belt.

In particular, the belt body 2 can be constructed with HNBR/ECO blend compounds as shown below and in FIG. 3 and FIG. 4.

Figure 2:
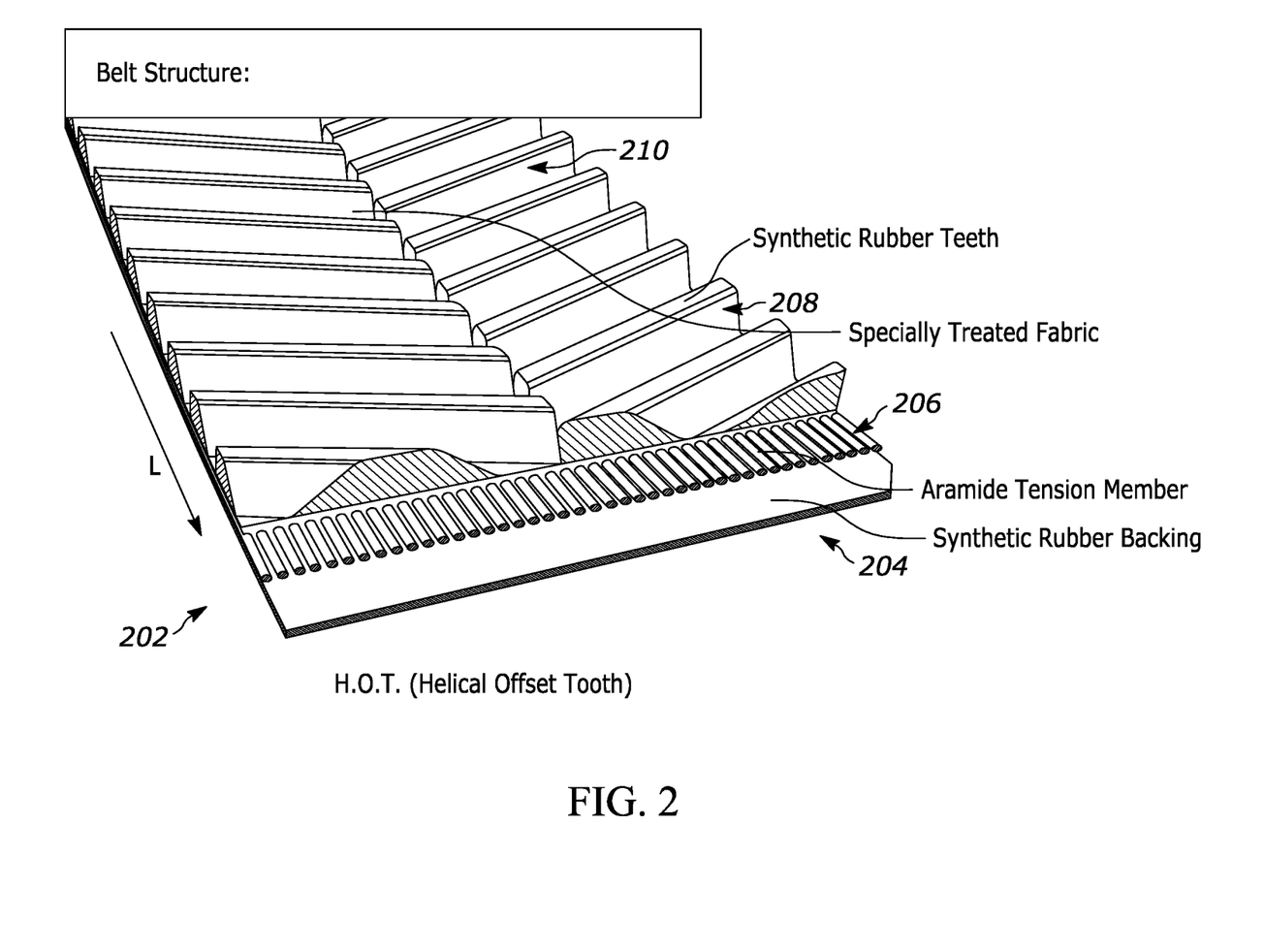
FIG. 2 is a diagram illustrating a timing belt 202 in accordance with one or more embodiments.

FIG. 2 is a diagram illustrating a timing belt 202 in accordance with one or more embodiments.

The timing belt 202 includes a synthetic rubber backing 204, an aramide tension member 206, synthetic rubber teeth 208 and a specially treated fabric 210.

The timing belt is shown with a L direction.

The timing belt 202 is constructed having one or more elastomeric compositions with HNBR/ECO Blend as shown below and in FIG. 3 and FIG. 4.

Figure 3:
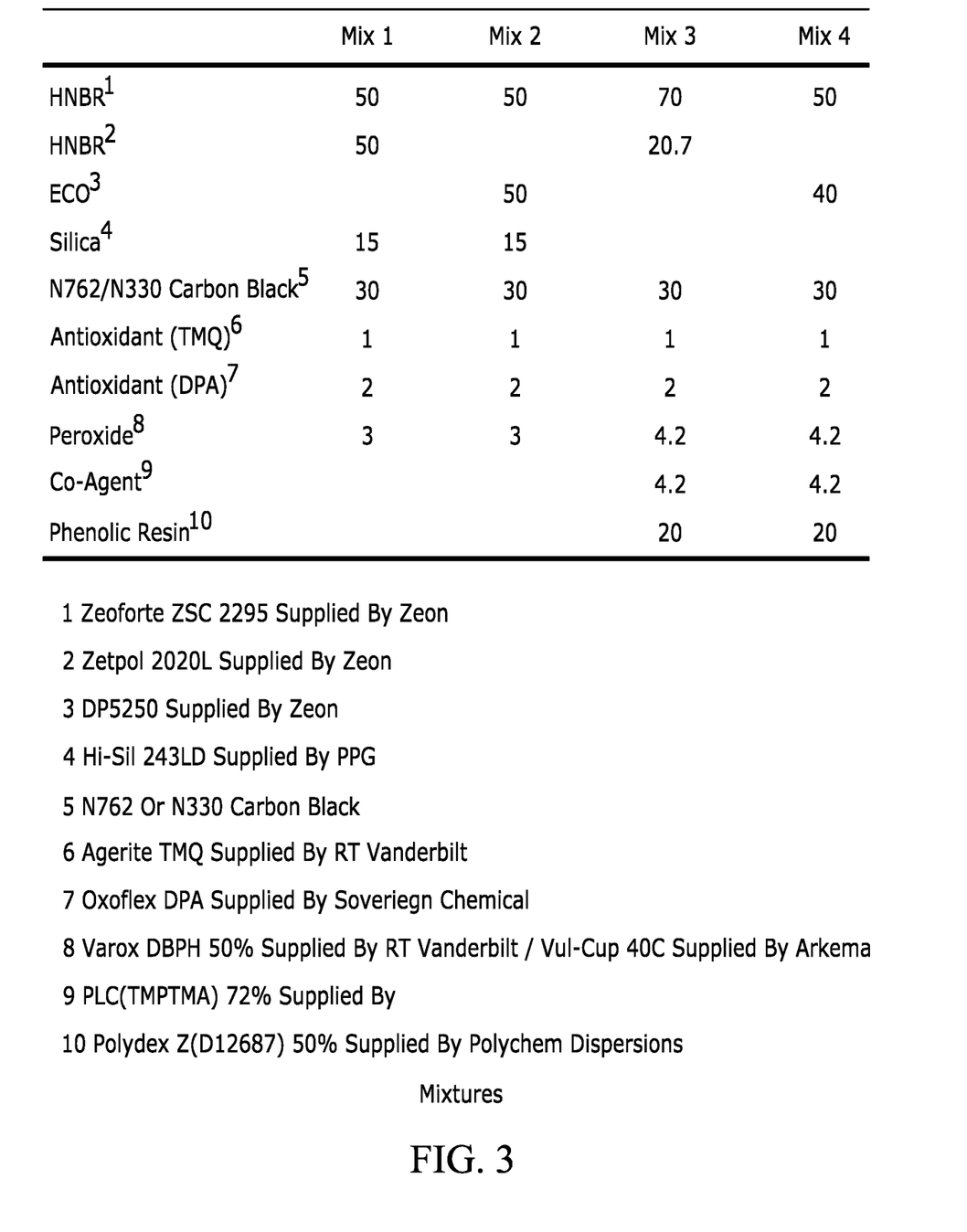
FIG. 3 is a table illustrating one or more suitable mixtures for an elastomeric composition.

FIG. 3 is a table illustrating one or more suitable mixtures for an elastomeric composition. The composition can be used with timing belts, belts and the like. Example suitable mixtures are provided for illustrative purposes, however it is appreciated that other suitable variations and other suitable mixtures are contemplated.

The table depicts four suitable mixtures shown as Mix1, Mix2, Mix3 and Mix4.

Figure 4:
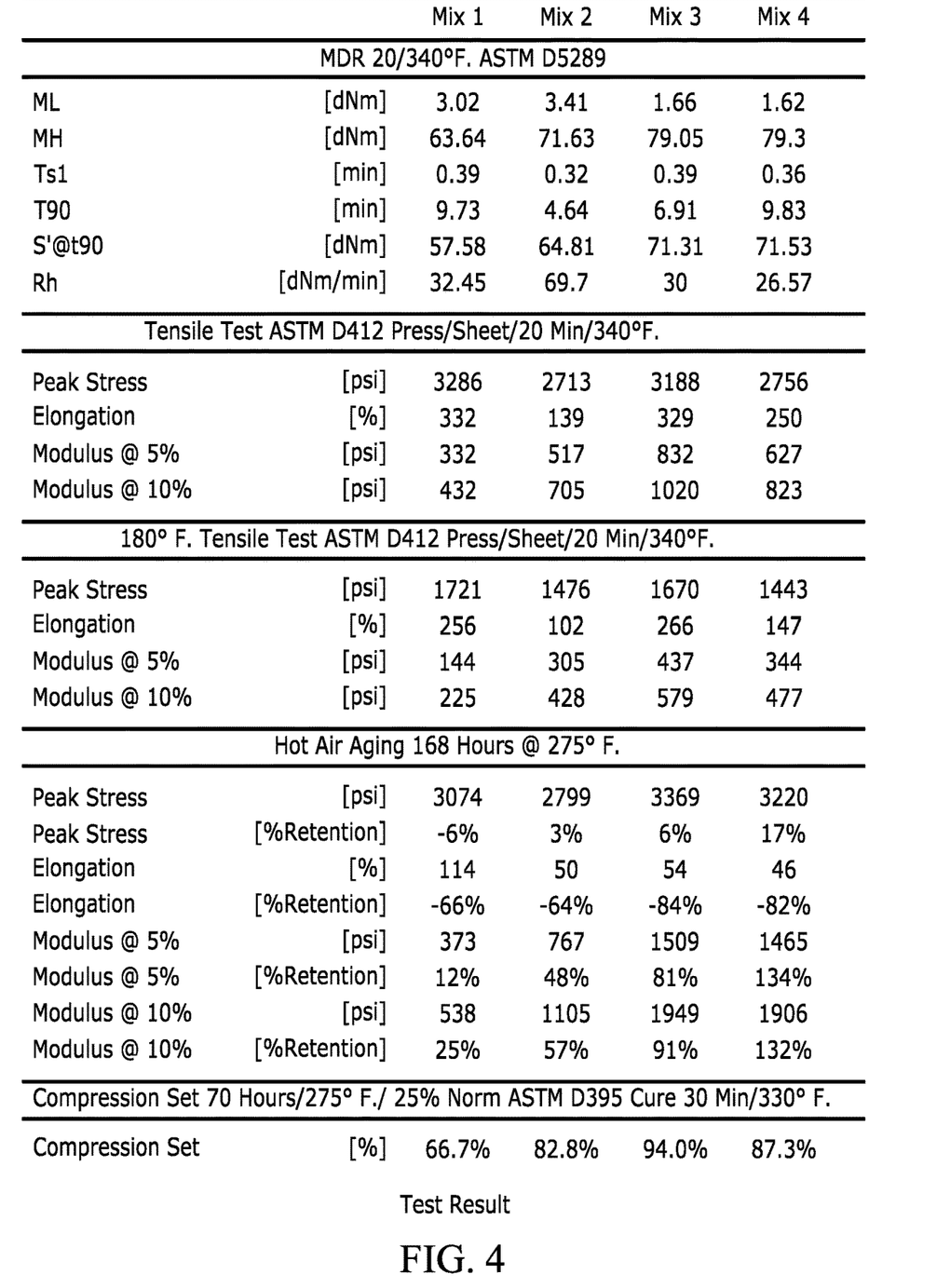
FIG. 4 is a table showing test results using the example mixtures as the elastomeric composition.

FIG. 4 is a table showing test results using the example mixtures as the elastomeric composition. The results are provided for illustrative purposes.

The low elongation modulus is maintained or in some cases increased. Similarly, at elevated temperatures the physical properties the low elongation modulus is maintained or in some cases increased. The performance of heat aging for 168 hours at 275° C. is equal to a formulation comprised solely of HNBR.

Through the replacement of a portion of the HNBR for ECO, there is an expectation of improvement in building tack, which would be beneficial in the belt manufacturing process.

In another embodiment, there is provided an elastomeric composition having hydrogenated nitrile rubber blended with Polyepichlorohydrin rubber, and a peroxide cure system. In one embodiment, the elastomeric composition may have from about 50 to less than 70 parts per hundred rubber (phr), and in another embodiment, about 40 to about 90 phr, and in another embodiment, from about 50 to about 80 phr and in still other embodiments, greater than about 50 to less than 100 phr of hydrogenated nitrile rubber. The elastomeric composition may further comprise from about 0.1 to about 70 phr, and in other embodiments, about 10 to about 60 phr, and in still other embodiments, from about 20 to about 50 phr of Polyepichlorohydrin rubber. It is noted that the amount of hydrogenated nitrile rubber, unsaturated nitrile rubber, in the elastomeric composition may vary from the ranges provided. The disclosed ranges are exemplary and illustrative of the level of dilution of hydrogenated nitrile rubber that may be obtained in the inventive embodiment. Unless otherwise stated, the term "about" is deemed to include the upper and lower stated range limits and appropriate equivalents outside the range limits. While HNBR is the preferred hydrogenated nitrile rubber, other hydrogenated nitrile rubbers and blends of hydrogenated nitrile rubbers may be used in the inventive embodiments.

"Hydrogenated nitrile rubber" is to be understood as meaning nitrile rubbers in which the C═C double bonds are partly or completely hydrogenated selectively (i.e. without hydrogenation of the C≡N triple bond). Hydrogenated nitrile rubbers may include those with a degree of hydrogenation, based on the C═C double bond originating from butadiene, of at least 75%. The degree of hydrogenation can be determined by NMR and IR spectroscopy. In an embodiment, the preferred hydrogenated nitrile rubber is hydrogenated acrylonitrile-butadiene rubber ("HNBR").

In certain embodiments, carboxylic acid ester grafted hydrogenated nitrile butadiene, and more preferably, zinc salt carboxylic acid ester grafted hydrogenated nitrile butadiene rubber may also be used. As a non-limiting list of useful zinc salt carboxylic acid ester grafted hydrogenated nitrile butadiene elastomers, the zinc salt carboxylic acid ester grafted hydrogenated nitrile butadiene elastomer can be any of the zinc salt carboxylic acid ester grafted hydrogenated nitrile butadiene elastomers sold by Zeon Chemicals, L.P., Louisville, Ky., under the trademark ZEOFORTE, or under any of the following Zeon Chemical product designations: ZSC 1295, ZSC 2095, ZSC 2195, ZSC 2295, ZSC 2295L, ZSC 2295R, ZSC 2395, and ZSC 2295L having a Mooney viscosity of 60-100, about 9% unsaturation and an acrylonitrile content of about 36%.

"Polyepichlorohydrin" is to be understood as meaning rubber comprised of copolymers of polyepichlorohydrin (ECH) and allyl glycidyl ether (AGE) as well as terpolymers of ECH, AGE, and ethylene oxide (EO). In an embodiment, the preferred polyepichlorohydrin is a terpolymer. As a non-limiting list of useful polyepichlorohydrin copolymer and terpolymers sold by Zeon Chemicals, L.P., Louisville, KY., under trademark HYDRIN, or under any of the following Zeon Chemical product designations: H1100, T3000, T3000L, T3000LL, T3100, T3102, T3105, T3106, T3108, T3108XL, T5010, and DP5250.

As used herein, the terms Hydrogenated Nitrile rubber and Polyepichlorohydrin rubber may refer to either a single rubber or a blend of more than one rubber species.

In addition to the HNBR, ECO, and described above, the elastomeric composition embodiments may include from 0.1 phr to about 250 phr, and in other embodiments, from about 10 phr to about 200 phr, and in still other embodiments, from about 30 phr to about 150 phr, of conventional carbon black. Non-limiting representative examples of carbon blacks that may be used individually or in combination include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990, and N991.

The elastomeric composition embodiments may further comprise from 0.1 phr to about 100 phr of non-carbon black reinforcing fillers and/or reinforcing agents. And, amounts above 100 phr may also be used. Examples of reinforcing agents are silica, talc, calcium carbonate and the like. In an embodiment, preferably about 1 to about 30 phr of non-carbon black reinforcing agents may be used in the elastomeric composition.

The elastomeric composition embodiments may include amounts of processing aids, which may comprise from about 0.1 phr to about 50 phr. Processing aids may include, for example, ester & polyester plasticizers, polyethylene glycol, naphthenic and/or paraffinic processing oils. Furthermore, the elastomeric composition embodiments may include suitable amounts of antioxidants, ranging from about 1 phr to about 25 phr. However, concentrations above 25 phr may be used. Representative antioxidants include (zinc) 2-mercaptotolylimidazole, alkylated diphenylamines, N-alkylated phenylenediamines, phenyl-.alpha.-naphthylamine, alkylated phenyl-.alpha.-naphthylamine, dimethyl quinolines, trimethyldihydroquinolines and oligomeric compositions derived therefrom, hindered phenolics, alkylated hydroquinones, hydroxylated thiodiphenyl ethers, alkylidenebisphenols, thiopropionates, metallic dithiocarbamates, 1,3,4-dimercaptothiadiazole and derivatives, oil soluble copper compounds, and the like.

Still other compounds that may be included in the elastomeric composition embodiments include adhesion promoters, which may include metallic diacrylates, such as anhydrous zinc diacrylate, metallic monomethacrylate monomers, trifunctional acrylate monomers, monofunctional acid esters, and trifunctional acid esters. Adhesion promoters may be used in amounts ranging from 0 phr to about 15 phr. Amounts above 15 phr may also be used. Further, elastomeric composition embodiments may comprise plasticizers ranging from about 0.1 phr to about 100 phr. Amounts above 100 phr may also be used. Non-limiting representative examples of useful plasticizers include dioctyl sebacate, chlorinated paraffins; however, a variety of other suitable plasticizers are known in the art and may be used. Fatty acids, which can include stearic acid, can make up from about 0.5 phr to about 5 phr of the elastomeric composition. Waxes can make up from about 0.1 phr to about 15 phr of the elastomeric composition. In an embodiment, microcrystalline and paraffin waxes may be used.

A sulfur cure system may be employed to cure the subject elastomeric compositions. Alternatively, in order to maximize the resistance of the vulcanizate to air aging at elevated temperatures and to counteract the reduction in heat resistance attendant the addition of ECO to the elastomeric compositions, a free radical crosslinking reaction using a free-radical promoting material can be used to cure the elastomeric compositions. In an embodiment, the reaction may be cured using a peroxide cure system. Well-known classes of organic peroxides that may be used as free-radical promoting substances include diacyl peroxides, peroxyesters, dialkyl peroxides and peroxyketals. More specific examples include dicumyl peroxide, n-butyl-4,4-di(t-butylperoxy)valerate, 1,1-di(t-butylperoxy)-3,3,5-trimethylcyclohexane, 1,1-di(t-butylperoxy)cyclohexane, 1,1-di(t-amylperoxy)cyclohexane, ethyl-3,3-di(t-butylperoxy)butyrate, ethyl-3,3-di(t-amylperoxy)butyrate, 2,5-dimethyl-2,5-di(t-butylperoxy)hexane, t-butyl cumyl peroxide, alpha.,.alpha.'-bis(t-butylperoxy)diisopropylbenzene, di-t-butyl peroxide, 2,5-dimethyl-2,5-di(t-butylperoxy)hexyne-3, t-butyl perbenzoate, 4-methyl-4-t-butylperoxy-2-pentanone and mixtures thereof. Typical amounts of peroxide range from about 0.1 to about 12 phr (based on active parts of peroxide). In another embodiment, the amount of peroxide may range from about 0.5 to about 7 phr.

A peroxide coagent may be added as part of the free-radical crosslinking reaction. Coagents are typically monofunctional and polyfunctional unsaturated organic compounds which are used in conjunction with the free-radical initiators to achieve improved vulcanization properties. Useful co-agents include 1,2-polybutadienes, organic acrylates, organic methacrylates, metal salts of an alpha, beta-unsaturated organic acid and mixtures thereof. Representative examples of acrylates and methacrylates coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris(2-hydroxy ethyl) isocyanurate triacrylate, tris(2-hydroxy ethyl) isocyanurate triacrylate, and tris(2-hydroxy ethyl) isocyanurate trimethacrylate.

The metal salts of alpha., .beta.-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum.

Suitable co-agent may be used in amounts ranging from about 0.1 phr to about 15 phr, and in other embodiments from about 2 to about 10 phr, and in still further embodiments, from about 4 to about 8 phr. In one embodiment, the co-agent may be trimethylolpropane trimethacrylate (TMPTMA). In another embodiment, the co-agent may be a metallic diacrylate such as SR633 sold by SARTOMER.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A timing belt comprising:
   a belt body having an outer surface and an inner facing toothed surface and comprised of an elastomeric composition;
   tensile members;
   the elastomeric composition comprising:
   from about 50 to 90 parts per hundred rubber of a zinc diacrylate modified hydrogenated acrylonitrile-butadiene rubber, and/or an unmodified hydrogenated acrylonitrile-butadiene rubber;
   from about 10 to 50 parts per hundred rubber of a peroxide curable polyepichlorohydrin copolymer or terpolymer;
   wherein the elastomeric composition is cured using a free radical promoting material, wherein the free radical promoting material is a peroxide selected from the group consisting of diacyl peroxides, peroxyesters, dialkyl peroxides and peroxyketals and is used in an amount from about 0.5 to 7 parts per hundred rubber, and
   wherein the composition includes a peroxide co-agent is selected from the group consisting of 1, 2 polybutadienes, organic acrylates, organic methacrylates, metal salts of an alpha, beta-unsaturates organic acid and mixtures thereof, which is used in an amount from about 2 to about 10 parts per hundred rubber.

2. The timing belt of claim 1, wherein the elastomeric composition includes from about 50 to 70 parts per hundred rubber of a zinc diacrylate modified hydrogenated acrylonitrile-butadiene rubber, and/or an unmodified hydrogenated acrylonitrile-butadiene rubber; and
   from about 30 to 50 parts per hundred rubber of a peroxide curable polyepichlorohydrin copolymer or terpolymer.

3. The timing belt of claim 1, the timing belt comprises an inner-facing surface having a row of adjacent teeth, the row of teeth comprising the elastomeric composition.

4. The timing belt of claim 3, the adjacent teeth having more parts per hundred rubber of a zinc diacrylate modified hydrogenated acrylonitrile-butadiene rubber, and/or an unmodified hydrogenated acrylonitrile-butadiene rubber than a belt body of the belt.

5. The timing belt of claim 3, the adjacent teeth having less parts per hundred rubber of a zinc diacrylate modified hydrogenated acrylonitrile-butadiene rubber, and/or an unmodified hydrogenated acrylonitrile-butadiene rubber than a belt body of the belt.

6. The timing belt of claim 1, wherein the elastomeric composition further comprising: from 10 phr to 80 phr of a carbon black.

7. The timing belt of claim 6, wherein the elastomeric composition further comprising: up to 20 phr of precipitated silica.

8. The timing belt of claim 7, wherein the elastomeric composition further comprising: up to 20 phr of plasticizer selected from the group consisting of ethers, esters, polyester, and phosphate.

9. The timing belt of claim 1, wherein the elastomeric composition further comprising ZDA and/or ZDMA added to compound for unmodified HNBRs from 5 to 30 phr.

10. The timing belt of claim 8, wherein the elastomeric composition further comprising from about 1 to 4 phr of an antioxidant or antioxidant combination, selected from the group consisting of (zinc) 2-mercaptotolyimidazole, alkylated diphenylamines, phenyl-α-naphthylamine, alkylated phenyl-α-naphthylamine, dimethyl quinolines, trimethyldihydroquinolines and oligomeric compositions derive therefrom, hindered phenolics, alkylated hydroquinones, hydroxylated thiodiphenyl ethers, alkylidenebisphenols, thiopropionates, metallic dithiocarbamates, 1,3,4-domercaptothiadiazole and derivitives, and oil soluble copper compounds.

11. The timing belt of claim 10, wherein the elastomeric composition includes from about 50 to 70 parts per hundred rubber of a zinc diacrylate modified hydrogenated acrylonitrile-butadiene rubber, and/or an unmodified hydrogenated acrylonitrile-butadiene rubber; and from about 30 to 50 parts per hundred rubber of a peroxide curable polyepichlorohydrin copolymer or terpolymer.

12. The timing belt of claim 1, wherein the elastomeric composition includes from about 50 to 60 parts per hundred rubber of a zinc diacrylate modified hydrogenated acrylonitrile-butadiene rubber, and/or an unmodified hydrogenated acrylonitrile-butadiene rubber; and from about 40 to 50 parts per hundred rubber of a peroxide curable polyepichlorohydrin copolymer or terpolymer.

* * * * *